United States Patent [19]
Welfeld

[11] Patent Number: 6,167,047
[45] Date of Patent: Dec. 26, 2000

[54] PACKET CLASSIFICATION STATE MACHINE

[75] Inventor: Feliks J. Welfeld, Ottawa, Canada

[73] Assignee: Solidum Systems Corp., Ottawa, Canada

[21] Appl. No.: 09/157,144

[22] Filed: Sep. 18, 1998

Related U.S. Application Data

[60] Provisional application No. 60/085,907, May 18, 1998.

[51] Int. Cl.[7] .................................................. G06F 7/22
[52] U.S. Cl. ................................... 370/389; 711/132
[58] Field of Search ................... 370/445, 412, 370/389; 711/132, 150, 168

[56] References Cited

U.S. PATENT DOCUMENTS

| | | | |
|---|---|---|---|
| 4,504,925 | 3/1985 | Gilhousen | 711/132 |
| 4,628,477 | 12/1986 | Burrows | 711/150 |
| 5,287,309 | 2/1994 | Kai | 711/132 |
| 5,574,910 | 11/1996 | Bialkowski et al. | 711/168 |
| 5,608,662 | 3/1997 | Large et al. | 370/412 |
| 5,680,585 | 10/1997 | Bruell | 395/500 |
| 5,761,424 | 6/1998 | Adams et al. | 711/168 |
| 5,905,902 | 5/1999 | O'Conner | 711/132 |

FOREIGN PATENT DOCUMENTS 2217063A  3/1998  United Kingdom .

OTHER PUBLICATIONS

M.L. Bailey et al., "The x–chip: An Experiment in Hardware Demultiplexing,".
P. Druschel et al., "Network Subsystem Design: A Case for an Integrated Data Path".
D.R. Engler et al., "DPF: Fast, Flexible Message Demultiplexing using Dynamic Code Generation".
Malin Flodin and Niklas Borg, untitled article, Jun. 10, 1997.
H.D. Lambright et al., "APF: A Modular Language for Fast Packet Classification," Aug. 30, 1996.
T.A. Proebsting et al., "Filter Fusion".
I. Wakeman et al., "Implementating Real Time Packet Forwarding Policies Using Streams," Nov. 7, 1994.
S. Wu et al. "A Fast Algorithm for Multi–Pattern Searching," May 1994.

*Primary Examiner*—Chi H. Pham
*Assistant Examiner*—Frank Duong
*Attorney, Agent, or Firm*—Freedman & Associates

[57] ABSTRACT

A programmable state machine comprising a program memory, a stack memory, and a processor is disclosed wherein the state machine operates with the processor accessing the program memory one or fewer times per state transition and wherein the processor is capable of accessing the stack and the program memory during a same state transition, at least one of a stack access operation and a program memory access operation performed independently.

28 Claims, 6 Drawing Sheets

Current State Register

Full Width Memory

| width | 1 | 1 | 2w | | |
|---|---|---|---|---|---|
| ACCEPT | 1 | 0 | Classification Tag | | |

| width | 1 | 1 | 1 | w-2 | 1 | w |
|---|---|---|---|---|---|---|
| REJECT | 1 | 1 | 1 | xxx | x | xxx |
| RETURN | 1 | 1 | 0 | xxx | 0 | xxx |

| width | 1 | w | 1 | w |
|---|---|---|---|---|
| JUMP | 0 | next ext. addr | 0 | xxx |
| JUMP/PUSH | 0 | next ext. addr | 1 | push ext. addr |

½ Width Memory

| N/A |
|---|
| N/A |

| 1 | 1 | 1 | w-2 |
|---|---|---|---|
| 1 | 1 | 1 | xxx |
| 1 | 1 | 0 | xxx |

| 1 | w |
|---|---|
| 0 | next ext. addr |
| N/A | |

Extended Address Format

| width | field |
|---|---|
| 1 | 1 = half width node, 0 = full width node |
| 1 | 1 = don't care node, 0 = $2^n$ way node |
| w-2 | Node address (See Below) |

Word address is w-2 +n bits wide. Word address for don't care nodes is equal to the node address filled on the left with zeros, for $2^n$-way nodes is formed by concatenating node address shifted n bits left with the current input symbol.

For full width nodes edges are a full word wide and the Current State Register is loaded with the contents of the memory location at the word address.

For half width nodes, edges are half a word wide. Either the most significant half word or the least significant half word is loaded depending on the halfword selector bit. The LS half of the Current State Register is filled with zeros.

Fig. 4

| Node | Address | Instruction Word Left half | Instruction Word Right half |
|---|---|---|---|
| S0 | 000000 | REJECT | |
|  | 000001 | JMP (S1) 000100x (half width) | PUSH (S7) 00100x0 (full width) |
| S2 | 000010 | REJECT | |
|  | 000011 | JMP (S3) 0001010 (Don't Care) | PUSH (S3) 0001010 (Don't Care) |
| S1 | 000100 | REJECT | JMP (S2) 00001x0 (full width) |
| S3 | 000101 | JMP (S4) 0001011 (Don't Care) | |
| S4 |  |  | JMP (S5) 0001100 (Don't Care) |
| S5 | 000110 | JMP (S6) 0001101 (Don't Care) | |
| S6 |  |  | POP |
| S8 | 000111 | JMP (S9) 001010x (half width) | JMP (S10) 001011x (half width) |
| S7 | 001000 | REJECT | |
|  | 001001 | JMP (S1) 000100x (half width) | PUSH (S8) 000111x (half width) |
| S9 | 001010 | CLASSIFY A | CLASSIFY B |
| S10 | 001011 | CLASSIFY C | CLASSIFY D |

PACKET CLASSIFICATION STATE MACHINE

This application claims benefit of provisional application 60/085,907, filed May 18, 1998.

FIELD OF THE INVENTION

The invention relates to programmable state machines and more particularly to programmable packet classification state machines for use in high-speed communication.

BACKGROUND OF THE INVENTION

A current area of research in high-speed state machine design is the area of digital communications. Commonly, in digital communication networks, data is grouped into packets, cells, frames, buffers, and so forth. The packets, cells or so forth contain data and classification information. It is important to classify packets, cells, etc. for routing and correctly responding to data communications. An approach to classifying data of this type uses a state machine.

For Gigabit Ethernet, it is essential that a state machine operate at very high speeds to process data in order to determine addressing and routing information as well as protocol-related information. Unfortunately, at those speeds, memory access is a significant bottleneck in implementing a state machine or any other type of real time data processor. This is driving researchers to search for innovative solutions to increase classification performance. An obvious solution is to implement a classification state machine completely in hardware. Non-programmable hardware state machines are known to have unsurpassed performance and are therefore well suited to these high data rates; however, the implementation of communication protocols is inherently flexible in nature. A common protocol today may be all but obsolete in a few months. Therefore, it is preferable that a state machine for use with Gigabit Ethernet is programmable. In the past, solutions for 10 Mbit and 100 Mbit Ethernet data networks required many memory access instructions per state in order to accommodate programmability. This effectively limits operating speeds of the prior art state machines.

A programmable state machine for classification of data can be implemented entirely in software. Of course, software state machines are often much slower than their hardware equivalents. In a software state machine, each operation is performed by a software instruction and state changes result in branch operations. As is evident to those of skill in the art, to implement a high-speed state machine in software for packet classification, requires many instructions per second—many more than a billion—requiring expensive parallel processors or technologies unknown at present. In fact, a severe limitation to performance is the speed of memory devices. For example, should a 7 ns memory device be used, less than one memory access per memory device is possible for each bit of a Gigabit Ethernet stream. Thus, if each byte—8 bits—of data is processed in a single state, only one memory access operations is possible for each state. To implement such a system as a purely software solution is unlikely.

Current state of the art integrated memory devices achieve performance in the area of 7 ns per memory access when timing and other factors are taken into account. Therefore, pure hardware implementations of state machines fast enough to implement a Gigabit Ethernet packet classifier are possible so long as only one memory access is required for every 8 bits within the Ethernet data stream. Prior art implementations of such a state machine use a branching algorithm to allow state transitions within the time frame of a predetermined number of bits. The address data for the branching algorithm is stored in program memory. When the predetermined number of bits is 8, each state transition occurs within 8 ns. One method of achieving this performance is to store a table of data having 256 entries for each possible state. The table address is then concatenated with 8 bits from the data stream to determine a next state address. This continues until a value indicative of a classification or a failure to classify is encountered.

Unfortunately, the amount of memory required to implement a system, such as that described above, is prohibitive. For example, using 8 bits at a time requires up to 256 entries per table, 16 bits at a time requires 65,536 entries. The exact number of tables also depends on a number of terminal states. Since integrated memory having a high storage capacity is not available, implementation of a prior art programmable packet classification state machines having large numbers of edges in integrated memory is currently not feasible.

It would be advantageous to provide a state-machine for classification of bits in a data stream requiring only one memory access to program memory per state transition.

It has been found that a programmable state machine for use in packet classification of high-speed data communications wherein program memory requirements are reduced over program memory requirements of prior art implementations would be highly advantageous.

OBJECT OF THE INVENTION

In order to overcome these and other limitations of the prior art, it is an object of the invention to provide state machine architecture for supporting programmable high speed packet classification.

It is another object of the present invention to provide state machine architecture for supporting implementation of high speed packet classification and requiring only one memory access to program memory for each state transition.

It is another object of the present invention to provide a state machine architecture for supporting implementation of high speed packet classification and providing for reduced memory requirements over those necessary in the prior art.

STATEMENT OF THE INVENTION

According to another embodiment, the invention provides a packet classification state machine for classifying data from a data stream. The state machine comprises:

a) programmable memory for storing information relating to states within the state machine;

b) stack memory for storing data indicative of a state, the stack memory operable independent of the programmable memory; and, c) a processor for retrieving information from the programmable memory one or fewer times per state transition and capable of retrieving information from the stack memory during a same state transition, the processor for determining a next state based on the current state and the data from the data stream, and for switching the state machine into the next state so determined.

According to another aspect of the invention there is provided a method of packet classification for classifying data from a data stream using a state machine, the method comprising the steps of:

a) providing information relating to states within the state machine, the information provided within a programmable memory;

b) providing a last in first out stack memory for storing data indicative of a state, said stack memory operable in parallel to the programmable memory;

c) retrieving information from the programmable memory one or fewer times per state;

d) determining an operation based on the information retrieved from the programmable memory, operations comprising a push operation for placing data on the stack; a pop operation for popping data from the stack, the data relating to a state; and a jump operation including data relating to a next state; and, e) switching the state machine into the next state.

According to the invention there is also provided a programmable hardware state machine for classifying data from a data stream. The state machine architecture supporting memory optimization. The state machine comprises:

a) a programmable memory for storing information relating to states within the state machine, b) a stack for storing data relating to a return state, the data for retrieval from the stack in a last in first out order; and, c) a processor for retrieving from the programmable memory an operation, the operations comprising a push operation including data relating to a next state address and a pop operation; for determining the next state based on one of information within the operation and data retrieved from the stack; and for switching the state machine into the next state, wherein the information for two groups of states occupies a same memory location, the stack functioning to distinguish the next state for each group.

According to the invention there is also provided a packet classification state machine for classifying data from a data stream. The state machine architecture supporting memory optimization. The state machine comprises:

a) a programmable memory for storing information relating to states within the state machine, the states including two groups of states;

a first group of states each represented by a table of data including table elements addressable at an offset from the table address, the table elements indicative of a next state within the state machine, a plurality of bits in the data stream for determining the offset,    a second group of states each represented by a table of data including a table element and occupying less memory than a table of data representing a state of the first group of states;

b) a stack for storing data relating to a return state, the data for retrieval from the stack in a last in first out order; and, c) a processor for forming an address based on a current state address and a plurality of bits from the data stream; for retrieving from that address in the programmable memory an operation, the operations comprising a push operation including data relating to a next state address, a jump operation including data relating to a next state address, and a pop operation; for determining the next state based on one of information within the operation and data retrieved from the stack; and for switching the state machine into the next state, wherein one and only one operation retrieving information from the programmable memory is performed per state transition.

BRIEF DESCRIPTION OF THE DRAWINGS

An exemplary embodiment of the invention will now be described in conjunction with the attached drawings, in which:

FIG. 2b is a simplified diagram of a classification tree for the packet classifications of FIG. 2a;

DETAILED DESCRIPTION OF THE INVENTION

As used herein, the term data packet encompasses the terms buffer, frame, cell, packet, and so forth as used in data communications. Essentially a data packet is a grouping of data that is classifiable according to a predetermined classification. Classifications are commonly codified by standards bodies, which supervise communication standards.

Figure 1A:
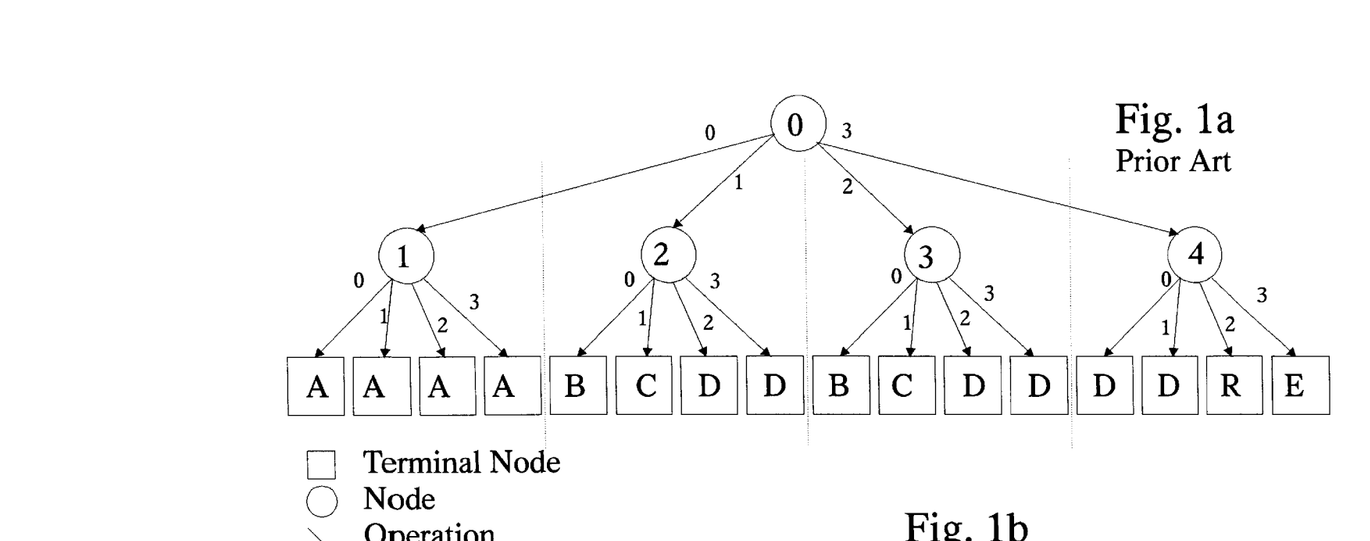
FIGS. 1a and 1b are simplified state diagrams for classification state machines according to the prior art.
Figure 1B:
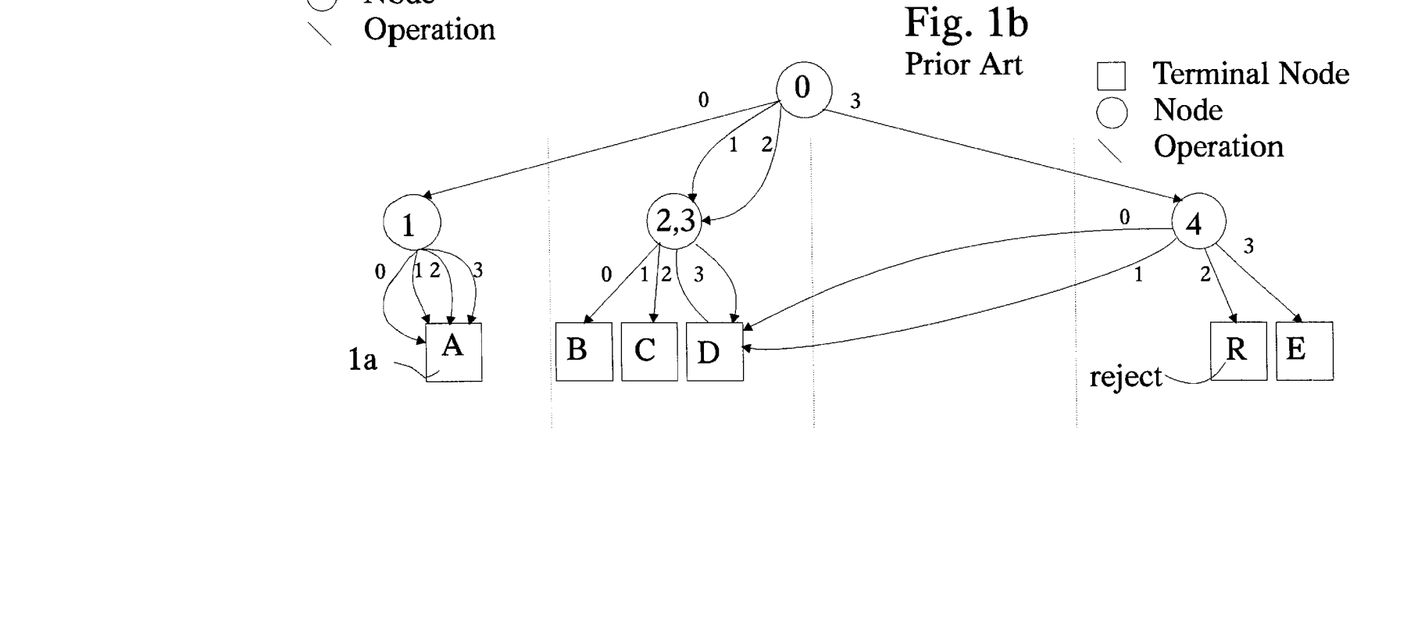

Referring to FIG. 1a a simplified state diagram of a typical classification state machine according to the prior art is shown. Transitions between states are represented by a series of operations shown as lines connecting states shown as circles. The state diagram is for an acyclic state machine and each state is followed by one of a number of possibilities. Such a state machine is easily implemented in either software or hardware. Unfortunately, as the speed of the state machine operation is increased, operations for each state transition must be executed concurrently in order to achieve necessary performance. This bottleneck has, heretofore, required dedicated non-programmable hardware state machine design. In FIG. 1b, a reduced state diagram is shown for the state machine of FIG. 1a. Here, terminal states of the classification A are combined into a single state 1a. Other states are similarly combined. As is evident from the diagram, the number of edges representing state transitions is somewhat reduced—from 20 to 16.Some states, such as state R, are terminal states, ACCEPT or REJECT. These states are followed by restarting the state machine. The restart typically occurs before the beginning of the subsequent packet. Typically there is a means external to the present invention to identify the start of each packet.

Figure 2A:
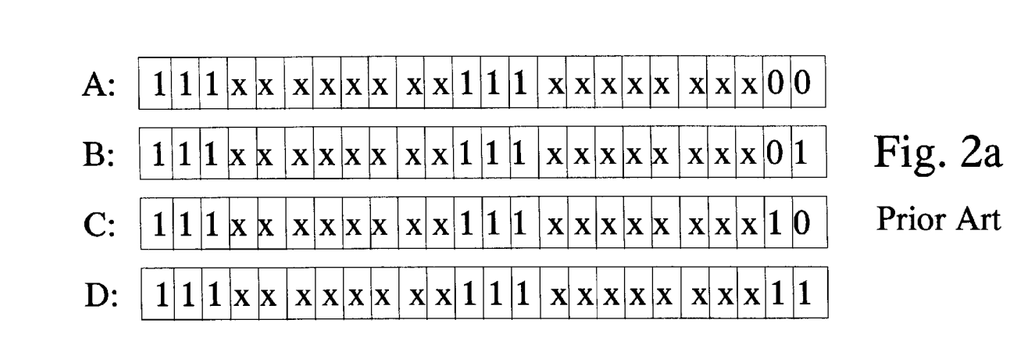
FIG. 2a is a simplified packet descriptor for classifying a packet as one of four classifications—A, B, C, or D.
Figure 2B:
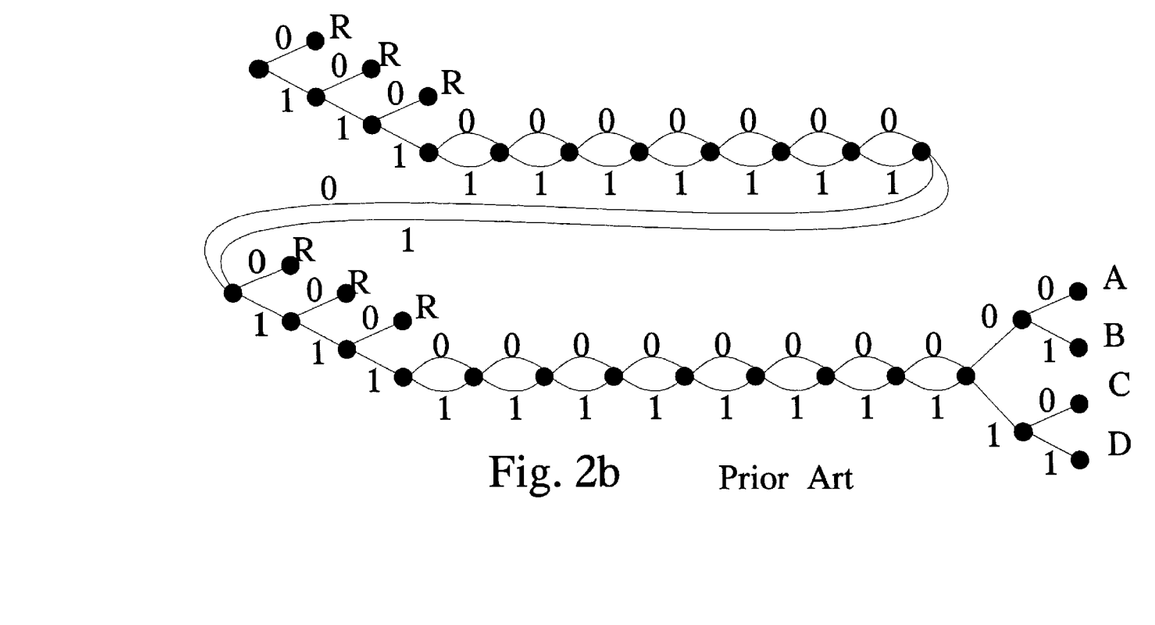

Referring to FIG. 2a, a simplified diagram of a greatly simplified protocol for packet classification is shown. The simplified protocol is used to facilitate understanding of the invention even absent detailed knowledge of Ethernet or other communication protocols. Four bit patterns are shown, each representing a different classification. The bit patterns are similar. A first set of three bits must each be one or the data within the data stream remains unclassified. This is followed by 8 bits, which are not important to the classification excepting that they occur. Three more bits must each be one and then eight more "don't care" bits. The final two bits are then used to distinguish between the four classifications. In FIG. 2b, a classification tree for implementing a programmable state machine is shown. A typical packet classification tree comprises data relating to a plurality of classification protocols each of which has many bits; the classification tree shown in FIG. 2b is simplified to facilitate explanation of the invention. Typical classification trees result in a very large data structures that are, in many instances, too large to store in a single integrated memory device.

For a gigabit Ethernet packet classification state machine operating on three bits per state, the first three bits arrive in 3 ns. Once provided to the state machine, there is a lag of 3 ns until a further 3 bits arrive. During those 3 ns, all operations for a state transition are completed. Of course, when more time is required to prepare for a state transition, more bits are grouped together. Thus a state machine for classification using two bits at a time is possible as is one using 8 bits or 16 bits at a time. Using embedded memory within the programmable device, fast memory access operations are possible, therefore for eight-bit operation—8 ns per state transition—at most 2 sequential memory access operations from a same programmable memory, and more likely only a single memory access operation, are possible for each state transition.

Such a state is easily implemented in a look-up table having a number of addresses or in another form of address conversion. For a look-up table implementation upon receiving the 8 data bits, only a single memory access is required for determining the next memory address for the look-up table. As an example, a current table address is loaded in the high order bits of a register. 8 bits from the data stream are loaded into the low order bits of the register and act as an offset of 0–255. Once loaded, data at the location indicated by the register is loaded into the higher order bits. It is checked for an accept or reject and the next 8 bits from the data stream are loaded into the low order bits to form a new address. This continues until a terminal state is reached.

As described above for large numbers of bits, look-up table storage becomes very large and results in increased costs and reduced performance by forcing the use of external memory devices. Therefore, it is evident that there is a practical limitation to the number of bits that may be processed in parallel in a programmable state machine. Also, since memory circuitry capable of supporting necessary speeds is currently limited to integrated memory circuitry, there is a limitation on the amount of memory that is available as classification data. Because of this limitation, memory optimization provides significant advantages.

For packet classification state machines, the resulting state is of significance for determining an operation or a packet class. As such, packet classification state machines follow a tree structure. When each node of the tree relates to one bit, the tree is very large and has many nodes, each node having two child nodes and one parent node. When each node relates to 8 bits, the tree has far fewer levels, but actually has a similar number of edges. Therefore, optimization of a classification tree appears inconsequential; however, as is evident to those of skill in the art, many nodes are of no consequence and, hence, optimization of those nodes which are useful in packet classification is an important aspect of a programmable state machine for this purpose.

Figure 2C:
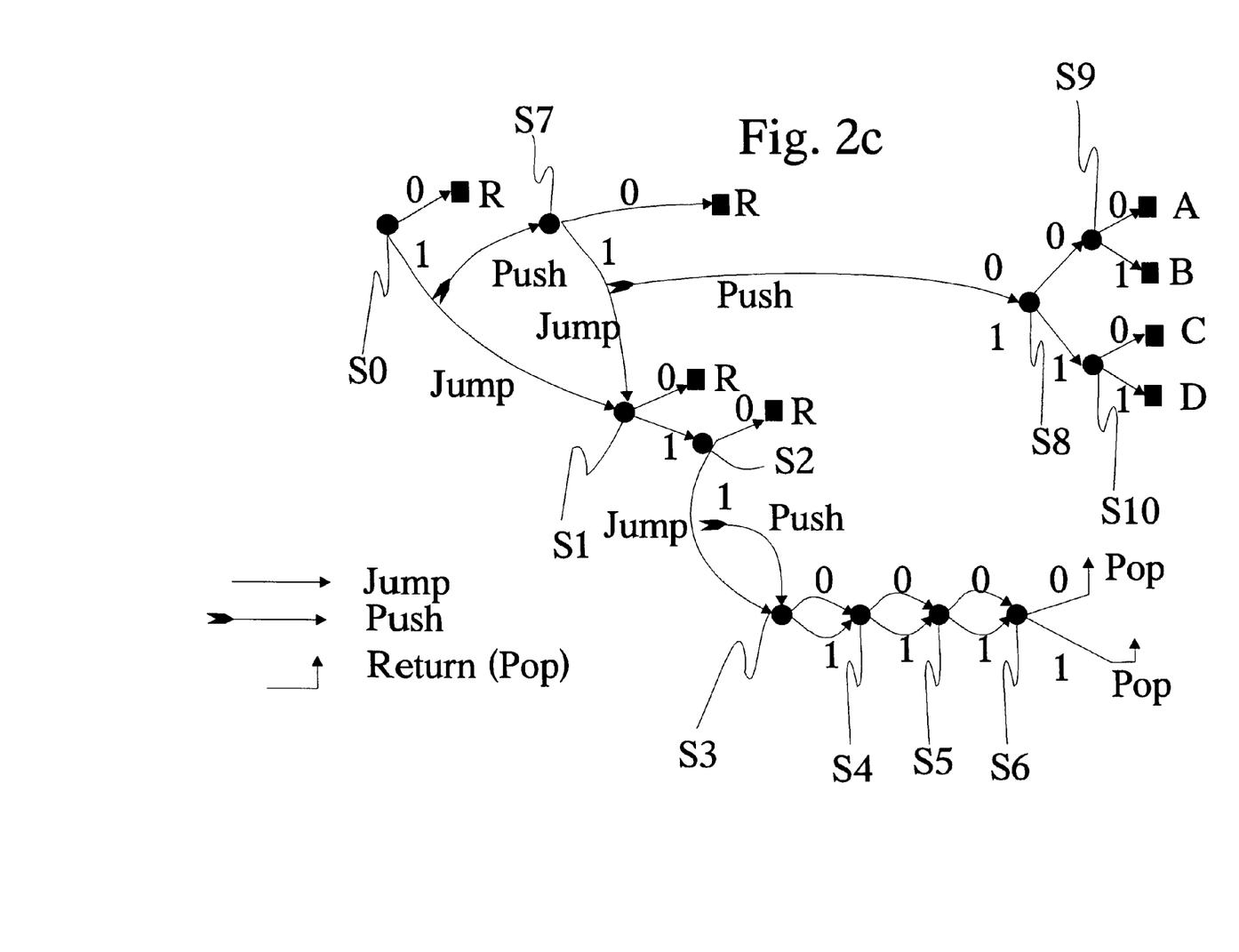
FIG. 2c is an optimised simplified classification tree equivalent to that of FIG. 2b.

A preferred method of classification data optimization makes use of a stack to allow reuse of parts of a classification tree as stored in different traversal paths. These are not always immediately evident. Referring to FIG. 2c, a stack is used in order to reduce the classification tree structure of FIG. 2b. The number of edges is reduced from 50 to 22. This is a significant reduction in overall storage requirements.

The preferred method also groups nodes into several categories each requiring a different amount of storage. Full width nodes S0, S2, and S7; half width nodes S1, S8, S9, S10; don't cares S3, S4, S5, S6 and so forth. By having different nodes occupying different amounts of memory, memory requirements are significantly reduced. Memory optimisation is preferred since, as disclosed above, once external memory is used performance is decreased. Of course, other forms of optimizing memory usage are also applicable in association with the present invention. For example, the nodes S3, S4, S5, and S6 each have only one possible next state. Thus, by storing these nodes having don't care node type, the number of edges is further reduced from 22 to 18.

For implementation of a tree traversal method according to the invention, it is preferable that every edge extending from a node—every address—is individually addressable whether it is a full width edge or a half width edge and whether it is word aligned or not. For example, full width nodes are word aligned and require, for a $2^n$ way node, $2^n$ words. Half width nodes are word aligned—for a two edge pair—and, for a $2^n$ way node, require $2^{n-1}$ words.

In an embodiment of a packet classifier with substantially optimized memory usage and capable of supporting high-speed packet classification, the following edge contents of a classification tree are used: ACCEPT, REJECT, JUMP, JUMP/PUSH, and RETURN (POP).

ACCEPT indicates that a packet is classified—a leaf of the classification tree is reached—and that appropriate action for the classified packet is desired. Some forms of appropriate action include passing a classification tag to a system or user, passing the packet to a predetermined routine, pushing the packet onto an application stack for a known application, and so forth. Packet processing is well known in the art of Ethernet communication.

REJECT indicates that a packet is not a of a classified packet type. As such no "appropriate" action is performed, though a default action is desirable in many situations. For example, a reject tag is provided to a system or user to indicate that classification was unsuccessful.

JUMP, JUMP/PUSH, and RETURN affect the contents of a current status register. In effect, these operations result in a change of the current node and therefore of the current state. Stack operations are described below. A JUMP operation loads an address contained in the word with the JUMP operation into the status register. This results in a change of state—a change to a different node within the classification tree. As such, a memory access is performed to retrieve the edge information and a further register to register transfer is performed to load new contents into the status register. Using a packet classification state machine designed specifically to implement the present invention, these actions are easily performed within existing time constraints. The inclusion of a command and data required to complete the command within a same word of data enables this performance.

Figure 3:
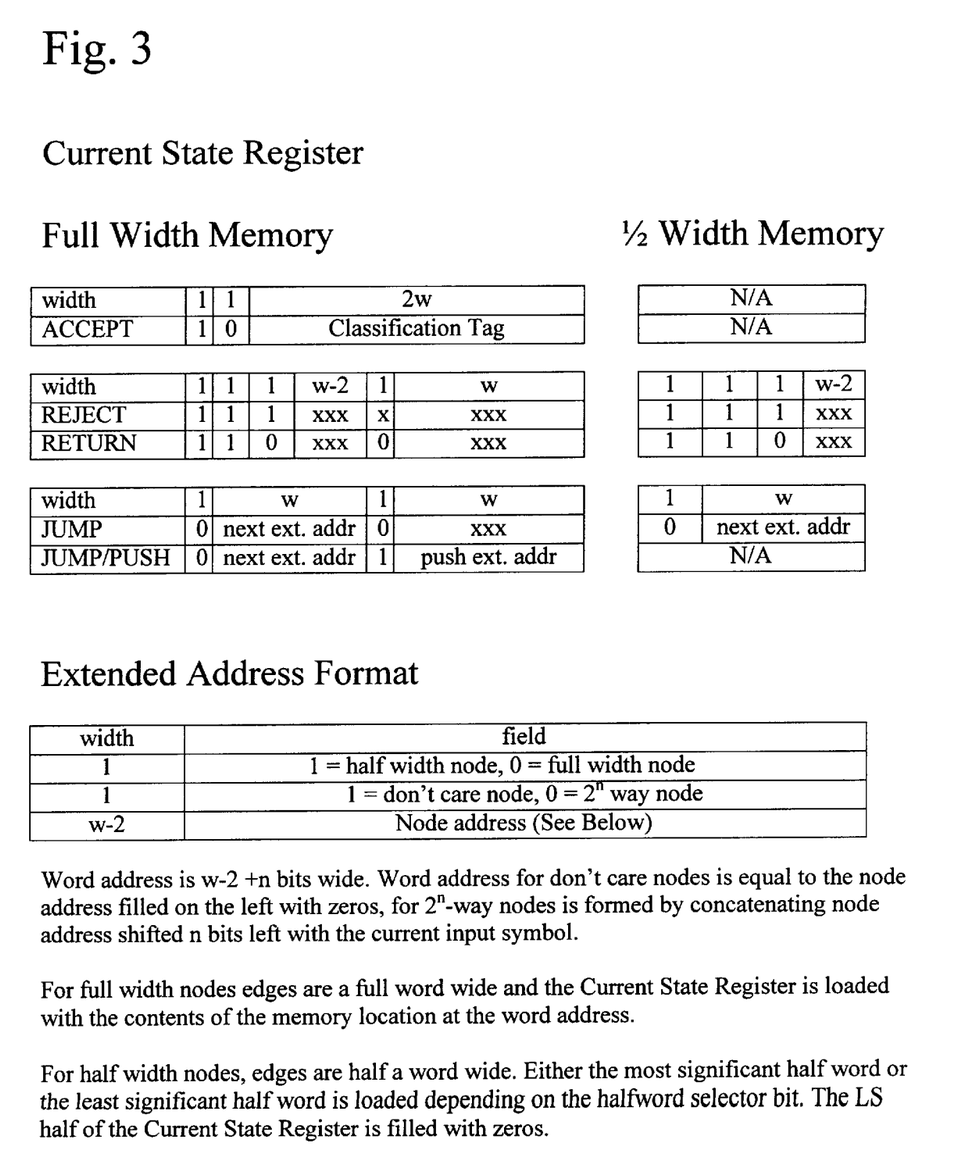
FIG. 3 is a table indicating memory usage and opcodes for an exemplary embodiment of a state machine according to the invention.

Referring to FIG. 3, a table shows memory word contents. Each word in a full width node comprises 2w+2 bits, where w is sufficient number of bits to represent an address within the classification tree—within the state machine. As is evident from the table, other than the ACCEPT and JUMP/PUSH commands, all other commands fit within a half word. This is significant for state machine optimization. As shown, the width need not include the lower order bits, which are inserted from the data stream being classified.

Figure 4:
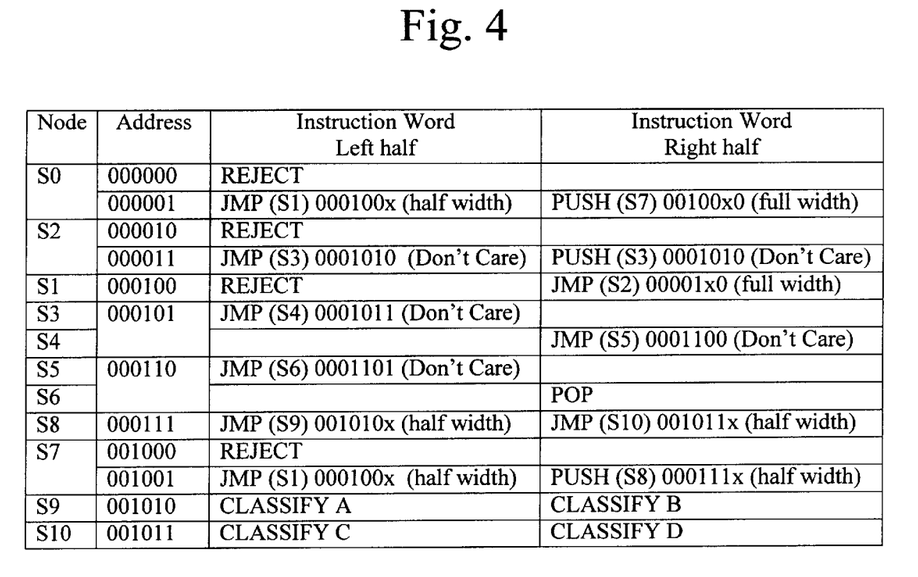
FIG. 4 is an address table for a classification tree implemented for the classification tree of FIG. 2c.

Operation of the state machine according to the invention is described below with reference to the classification tree diagram of FIG. 2c. Resulting memory contents are shown in FIG. 4. A first bit is received and inserted within the state register to fill in the lowest order bits of the address within the state register. As is evident from the address table, two results are possible for the combination of the seven address bits within the address register and the remaining bit. Each of the resulting addresses comprises a JUMP operation and results in loading of the state register with a new node address. The address is a 7 bit address (w is 7) and the remainder of the address is then filled in by the proceeding bit from the data stream, one or zero. The bit to be filled in is indicated by an "x". In an embodiment, as shown, don't care nodes are implemented wherein the address is complete absent a bit from the data stream because all edges from the node are identical. Preferably, the data is stored to optimise this concatenation of bits to form an address from which a next command is fetched. In this fashion when a stack operation is not performed, each node transition incorporates the following operations: modify state register based on bit within data stream, retrieve data from node data at appropriate edge location, process command, and when the command affects the state register, modify the state register contents. It is evident to those of skill in the art that this process is quickly performed in specialized hardware for this purpose. Alternatively, the address is incremented by an appropriate number of operations by a method other than simple concatenation.

Referring again to FIG. 2c, a same classification tree to that of FIG. 2b is shown wherein common elements are removed and replaced by sub trees, which, if traversed like a subroutine, require stack operations. Since, as mentioned above, memory optimization is significant in order to reduce cost, maximize flexibility, and so forth, it is very helpful to reduce memory usage by reusing a same section of a classification tree in several different traversal paths.

When tree traversal reaches node S2 and the next bit is a one bit, a JUMP/PUSH operation is executed to indicate the necessary JUMP operation and the destination node address for pushing onto the stack. Once the tree section is successfully traversed and a RETURN operation is encountered, the node whose address is on top of the stack becomes the next node. In essence, the JUMP operation reaches a node forming part of a sub tree that leads to different nodes at an end thereof. The sub tree is commonly jumped to from several different nodes. The resulting nodes are indicated in the pushed address. The push operation is a stack memory operation and requires a memory access to stack memory. This memory access, however, is performed during a state transition, for example while the packet bits are being loaded into the state register. As a result, stack operations have only a small effect on performance and selection of a width w and a number of packet bits analyzed per node allows for operation of the device, even at gigabit speeds. It is evident that when speed is not a significant design constraint, the stack memory and the programmable memory may be incorporated into a same memory circuit and, in such a case, operate synchronously. Using such a configuration, many of the advantages of the invention are maintained for lower speed packet classification operations.

When the last node S6 in the sub-classification is reached, a RETURN operation results and the state register is loaded with an address from the stack. Again stack related operations are implemented to occur in such a fashion that they do not cause significant delays. For example, a value from the stack memory is popped and is loaded into the state register with the packet bits from the data stream. As is evident to those of skill in the art because a large amount of nodes are identical in a typical classification tree, the use of a stack according to the invention results in a more efficient memory usage for storing the classification tree and therefore in reduced memory requirements. In fact, as memory requirements in terms of nodes, are reduced, w is also reduced, thereby further reducing hardware memory requirements. Preferably, memory requirements are reduced sufficiently that no external memory is required for implementing the state machine.

Referring to FIGS. 2c and 4, the stack contents proceed as follows:

| Transition | Stack Contents (bottom=>top) |
| --- | --- |
| S0/S1 | S7 |
| S2/S3 | S7_S3 |
| S6 POP S3 | S7 |
| S6 POP S7 | |
| S7/S1 | S8 |
| S2/S3 | S8_S3 |
| S6 POP S3 | S8 |
| S6 P0P S8 | |

Figure 5:
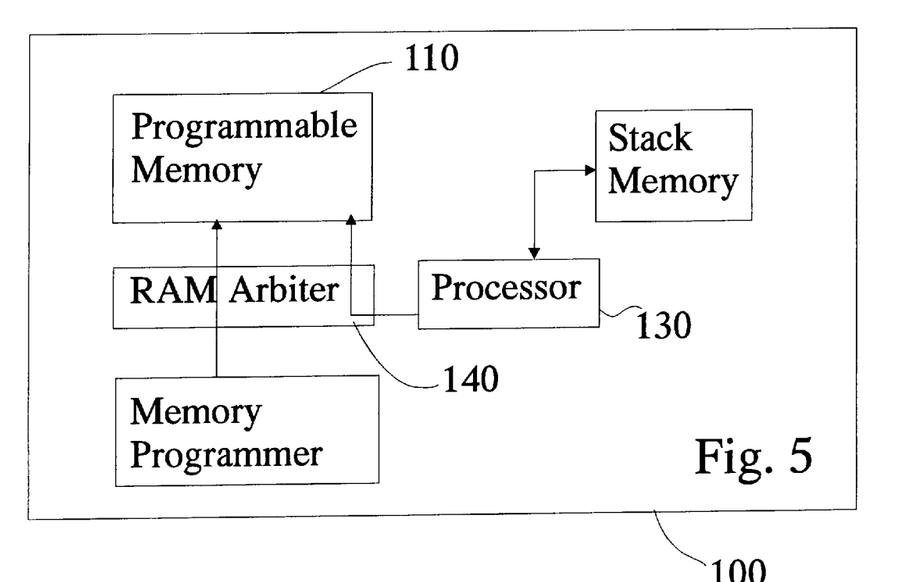
FIG. 5 is a simplified block diagram of an integrated circuit implementation of an acyclic classification state machine according to the invention.

A simplified block diagram of a classification state machine according to the invention is shown in FIG. 5. The state machine is useful for classifying data from a data stream and in particular for classifying data packets. The state machine, as shown, is integrated within a single integrated circuit 100. The integrated circuit 100 comprises a programmable memory 110, a last in first out (LIFO) memory 120, a processor 130, and a programmable memory arbiter 140.

The programmable memory 110 in the form of fast static random access memory (RAM) is preferred, since static RAM is capable of achieving performance speeds that enable support of high-speed operation. Of course for low speed operation, such as that necessary for operating a 10 Mbit Ethernet packet classification state machine, known DRAM circuitry is used to increase densities and decrease costs. The RAM 110 is for storing information relating to classification of stream data—classification tree data. Alternatively stated, the RAM 110 is for storing data relating to states within the state machine.

For example, in the RAM 110 data relating to each state machine node is stored. The data is stored in tables, each table having a table address and a table format. The RAM 110 is accessible by the processor 130 one time per state transition. Also, the processor 130 has a highest priority when accessing classification data within the RAM 110. This ensures that no other RAM access operations affect state machine performance. The programmable memory arbiter 140 controls access to the RAM 110. The programmable memory arbiter 140 ensures that reprogramming of the RAM 110 does not effect performance of the state machine. Effectively, at low speeds the arbiter 140 guarantees the processor a single access to the RAM 110 for every state transition. For faster data rates, the arbiter prevents RAM access operations other than by the processor 130 while classification operations are underway. This essentially limits reprogramming of the programmable memory 110 to times when the state machine is disabled to allow for reprogramming or when incoming data is part of a classified packet, there are no packets requiring classification. A state machine is commonly disabled to allow reprogramming when it is used in security applications requiring changes in programmable memory contents due to security concerns.

In order to achieve the preferred goal of a single RAM access by the processor per state transition, a stack operation is implemented independent of the RAM access operations. For example, stack operations may operate in parallel to the RAM access operations so far as they do not require information one from the other. For example, when a stack push operation requires a time greater than a single state transition in order to complete, the operation can proceed irrespective of RAM access operations so long as the classification data is compiled in accordance with this known limitation, thereby avoiding classification data structures containing a stack push operation and a stack operation in a subsequent state transition.

The stack memory 120 is for storing data indicative of a state in the form of a table address of a table within the RAM 110 that corresponds to a next state. The stack memory 120 is operable independent of the RAM 110. Stack operations are preferably initiated in dependence upon data retrieved from RAM 110. Therefore in such a preferred embodiment, the stack memory 120 is not accessed until the processor 130 has accessed the RAM 110. The stack memory 120 is operable independent of—asynchronously to—the RAM 110. When this is the only limitation, implementation of the invention is straightforward.

According to a preferred embodiment of the invention, data retrieved from the stack memory 120 is used immediately after a state transition in retrieving data from RAM 110. Therefore, retrieval of data from RAM 110 and subsequently from the stack memory 120 occurs for a single same state transition according to this preferred embodiment.

According to an alternative embodiment of the invention, the classification data is so arranged as to allow a push operation—an operation to store data within the stack memory 120—to require more than one state transition to complete. Typically, however, the processor 130 stores information in the stack memory 120 in response to data retrieved from the RAM 110 for a state transition, the information stored in the stack memory 120 for a same state transition.

The processor 130 is for retrieving information from the programmable memory 110 one or fewer times per state transition. Preferably, a single access to programmable memory occurs for each state transition during classification. Of course, once data is classified, there is a pause in state machine operation until a next packet commences. During this pause, the RAM arbiter 140 allows programming of the RAM 110. Thus, even at very high speeds, the state machine is fully programmable.

The processor retrieves data from the RAM 110 and uses the data to perform an operation for determining a next state and then switches the state machine into the next state so determined. Sometimes, the next state is determined from data retrieved from the stack memory 120. This occurs when a RETURN operation is retrieved from the RAM 110. Upon determination of a RETURN operation, stack memory access is performed to determine the next state. The address on the stack is "popped" leaving an earlier pushed address at the top of the stack memory 120. Of course, when no earlier pushed address exists, the stack is empty.

The JUMP/PUSH operation requires more storage than other operations. The JUMP/PUSH operation requires a next state address, an address to push into stack memory 120, and information relating to the operation. The address for pushing is an address of a next state for retrieval, by popping, from the stack memory 120 at some later time. Thus, a single JUMP/PUSH operation within a node of a classification tree results in a table associated with that node being full width. A node with no JUMP/PUSH operations is stored in less space—half width. In order to accomplish this, each operation indicating a next state, whether popped from the stack or retrieved from RAM 110, indicates information relating to the format of the next state. This supports a method of memory optimization where some tables occupy less space in programmable memory 110 than do others.

Though herein the ACCEPT operation is provided with a small amount of bits for indicating a classification, this is optionally increased in any of several ways. In a first way, an ACCEPT operation is implemented with a value that is an index to a classification, thereby allowing lengthy classification codes. Alternatively, ACCEPT operations are implemented using full width nodes providing an extra w bits for classification results. Of course, the two methods may be combined.

Preferably, the arbiter 140 provides transparent access to the programmable memory 110 for the processor 130. This is achieved by blocking memory access operations for reprogramming the program memory 110 when a memory access from the processor 130 is a potential operation. Since the processor 130 is provided highest priority, it is essential that it not be blocked in attempting to access the programmable memory 110. Alternatively, other methods of arbitrating between ports are employed.

Of course, since the processor does not access programmable memory 110 more than one time per state transition, when more than a single RAM access is possible per state transition, the processor is allocated one access to programmable memory 110 and reprogramming the programmable memory is performed during other accesses to the memory for a same state transition.

When new packet data is detected, the processor is provided with a start address for beginning classification operations. The start address is programmable and is used in accordance with a method of reprogramming the programmable memory as described below.

Clock sources for use according to the invention are selected based on an application and based on current knowledge within the art. Selection and implementation of clock sources and of methods of synchronizing clocks to network provided clock sources are well known in the art of communication hardware design.

Unlike conventional solutions for Gigabit Ethernet that depend upon either a fast host CPU, or an imbedded CPU to examine each frame at or near real time, the present invention scales easily to gigabit rates. A CPU 10 times faster per port is not economical. Further, required processing speed varies with complexity of classification criteria. These limitations are not present according to the present invention.

Figure 6:
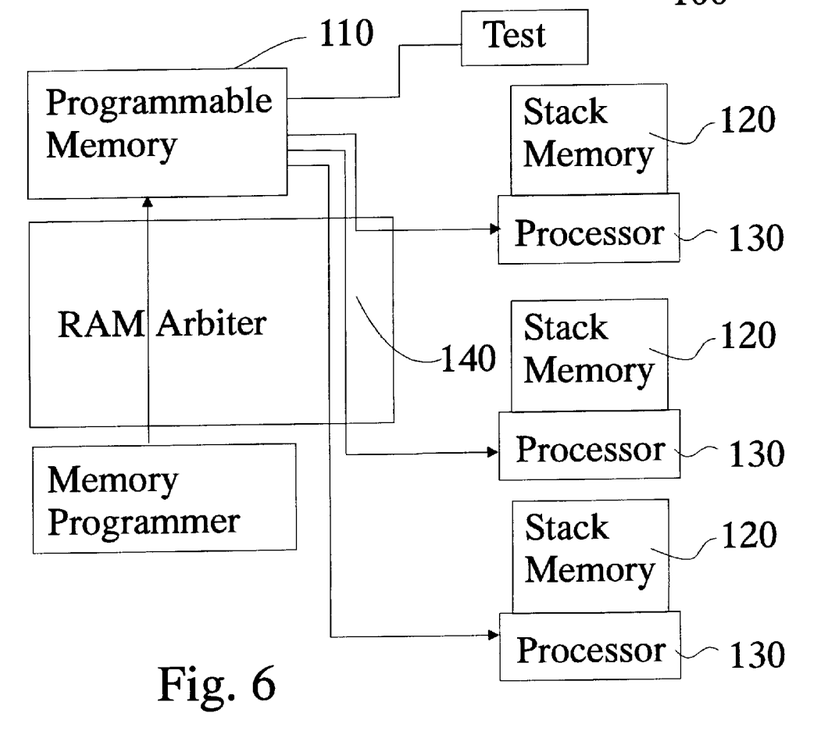
FIG. 6 is a simplified diagram of a system according to the invention of implementing a plurality of state machines using a single same programmable classification data memory.

In an alternative embodiment, when implementing a 10 Mbit Ethernet packet classification state machine, several processors use a same programmable memory 110. This is shown in FIG. 6. The resulting system has a plurality of processors 130, a same number of stack memories 120, and a single programmable memory 110. Each state machine is simultaneously classifying data according to a different classification tree structure. Alternatively, several processors follow a same classification tree structure. Also, classification data associated with each processor is independently programmable. This allows for data optimization based on tree structure commonalties between different state machines and between portions of a tree of a single state machine.

Reprogramming of the program memory 110 is accomplished by adding new table data relating to changes in the classification tree structure of one or more state machines from an existing node in the tree back toward the root of the tree. The root address is then provided as a start address to the processor executing that state machine. When tables stored within the programmable memory 110 are no longer used by any processor, those memory locations are reused during subsequent reprogramming. In this way, programming occurs during operation of the state machines without affecting existing programming or existing classification operations.

Because of the above, it is important to automate, so much as possible, the classification data table generation and optimization process. Once automated, the specification of packet classification is unimportant in a procedural sense and becomes a process of pattern matching. Essentially, tree construction is a matter left to a packet classification program compiler. Of course, a similar system is applicable to filtering which is considered packet classification with two classes—accept and reject.

Preferably, an indication that a node is half width, full width, or don't care is registered and stored for use in the subsequent state. Stored in memory is node information of a direct acyclic state machine. A stack memory is also provided. Preferably, protocol descriptions are provided and during configuration, those protocols that are selected are compiled into a classification tree, optimised, and stored in programmable memory of the state machine device. Nodes of the state machine have one of the following four formats: full width, half width, don't care, and $2^n$ way. Each of these node formats is related to a format for storing edge information extending from the nodes. Don't care nodes have one edge to a following state node. $2^n$ way nodes have $2^n$ edges. Full width nodes are implemented such that each edge is allocated a complete word, while half width nodes store information relating to each of two edges within a single word. Basically, some edge information requires a half word of information or less and others require more. When a single edge from a node requires more than a half word of information for implementation, then all edges from the node are full width. Otherwise, the edges are optimized to half width. Also, where all edges from a node are identical, storage is reduced to a single edge. Of course, other node types having other memory storage optimizations are possible within the scope of the invention.

In this way memory optimization is enhanced. By applying both memory optimization techniques, significant memory optimization occurs. This permits implementation of an integrated programmable packet classification state machine according to the invention. In order to achieve reasonable performance and cost, it is useful to optimize the tree data structure using stack operations and then to optimise the table data generated thereby by condensing tables into a smallest representation from a group of representations. Of course, where desired, other representations are used. Also, further optimization or less optimization is used depending on a particular application.

Preferably, compiler software maintains an image of the data within the programmable memory and determines memory in use and memory locations, which are no longer part of any state machine classification data. In this way, frequency of memory overflow is reduced by allowing reuse of memory once its contents are obsolete. Though this appears straightforward, because the present invention supports incremental programming and the program memory can support a plurality of processors, it is very useful to track memory allocation automatically.

Though the preferred embodiment uses a single access by the processor to programmable memory per state transition, the invention may also be implemented where unnecessary accesses to the programmable memory are replaced with, for example, a counter. Thus when 4 Don't care states are in succession, a count command is loaded with a count number, 4, and a next address. Data from the next address within programmable memory is retrieved once the counter has completed counting the specified number. For a single Don't care, this eliminates a single memory access.

As is evident to those of skill in the art, the programmable memory is accessed for read purposes by the processor of the state machine. The state machine processor does not write to the programmable memory. Conversely, the programming of the programmable memory only requires write operations. Therefore a memory having a write access and a separate read access—dual port—is applicable to the invention. In a further alternative embodiment, true dual port memory is used and memory arbitration is unnecessary or is provided within the memory circuitry. Alternatively, programming and diagnostics uses read write access to the programmable memory while the processor has read access to the programmable memory.

Preferably, the invention is implemented within a custom IC such as an ASIC. For example, when migrating to gigabit data rates, more efficient handling of frames rejected by the classification process is achieved by incorporating the classification system within a MAC. Once a rejection decision is made, the MAC stops DMA of the incoming frame into host memory or if DMA has not started flushes the frame from it's queue. The same receive descriptor is then used without any involvement of the driver software, thereby, reducing traffic on a host's bus.

There are several other benefits of integrating the method according to the invention inside the MAC. These include: elimination of a host bridge reducing host bus loading by loading the pattern memory through the MAC's interface; no storage required for associating classification results with a ring descriptor as required when using a separate classification component since the association is obvious; and benefits of caching are maximized because the receive ring descriptor is located anywhere that the driver desires.

Alternatively, when implemented within an FPGA, the design is preferably optimized for implementation within the type of FPGA used.

Numerous other embodiments of the invention are envisioned without departing from the spirit or scope of the invention.

What is claimed is:

1. A packet classification state machine for classifying data from a data stream, the state machine comprising:
   a) programmable memory for storing information relating to states within the state machine;
   b) last in first out stack memory for storing data indicative of a state, the stack memory operable independent of the programmable memory; and,
   c) a processor for retrieving information from the programmable memory one or fewer times per state transition and capable of retrieving information from the stack memory during a same state transition, the processor for determining a next state based on the current state and the data from the data stream, and for switching the state machine into the next state so determined.

2. The state machine of claim 1 wherein the state machine is implemented in a single integrated circuit.

3. The state machine of claim 1 wherein the processor is for retrieving information from the stack memory during a state transition in response to data retrieved from the programmable memory, the data retrieved during a same state transition.

4. The state machine of claim 1 wherein the processor is for storing information relating to a future state in the stack memory in response to data retrieved from the programmable memory during a state transition, the information stored in the stack memory for a same state transition.

5. The state machine of claim 1 wherein the stack memory is operable in parallel with the program memory.

6. A packet classification state machine for classifying data from a data stream, the state machine comprising:
   a) a programmable memory for storing information relating to states within the state machine;
   b) a last in first out stack memory for storing data indicative of a state, said stack memory operable independent to the programmable memory; and,
   c) a processor for retrieving information from the programmable memory; determining an operation based on contents of the programmable memory and the data from the data stream, operations comprising a jump-push operation including data relating to a next state and data for placing on the stack; a pop operation for popping data from the stack, the data relating to a future state; and a jump operation including data relating to a next state; and for switching the state machine into the next state so determined.

7. The state machine of claim 6 wherein the state machine is implemented in a single integrated circuit.

8. The state machine of claim 6 wherein the processor retrieves information from the programmable memory only once per state transition.

9. The state machine of claim 6 wherein the processor retrieves data from the programmable memory only once per state transition and also performs a stack pop operation during some state transitions, the popped data relating to the next state.

10. A method of packet classification for classifying data from a data stream using a state machine, the method comprising the steps of:
    a) providing information relating to states within the state machine, the information stored within a programmable memory;
    b) providing a last in first out stack memory for storing data indicative of a state, said stack memory operable independent of the programmable memory;
    c) retrieving information from the programmable memory one or fewer times per state transition;
    d) determining an operation from a plurality of avaialable operations based on the retrieved contents of the programmable memory and data from the data stream, the available operations comprising a jump-push operation for placing data on the stack memory; a pop operation for popping data from the stack memory, the data relating to a state; and a jump operation including data relating to a next state; and,
    e) switching the state machine into the next state.

11. The method of claim 10 comprising the step of classifying a plurality of data streams in parallel using a same program memory, a current state for a data stream from the plurality of data streams different from that for other data streams from the plurality of data streams.

12. The method of claim 11 wherein a plurality of processors are each used for classifying a different data stream from the plurality of data streams, each processor having a different associated stack memory and each processor performing the step of retrieving information from the same programmable memory one or fewer times per state transition.

13. The method of claim 10 comprising the step of:
    reprogramming the programmable memory concurrently with packet classification operations including steps (c), (d), and (e).

14. The method of claim 13 wherein the step of reprogramming the programmable memory comprises the steps of determining addresses within the programmable memory that are not associated with any state machine and storing classification data at those addresses.

15. The method of claim 14 comprising the step of determining a first state address, the first state address retrieved from a predetermined memory location and when reprogramming the programmable memory is complete, storing a new first state address in the predetermined memory location.

16. The method of claim 10 comprising the step of performing a stack pop operation during state transitions.

17. The method of claim 10 wherein the jump-push operation further includes information relating to the next state, and wherein the data is pushed on the stack during a current state transition.

18. The method of claim 10 wherein the information comprises data relating to the next state and data relating to the format of the information relating to the next state.

19. The method of claim 10 wherein the information for some states occupies less memory than the information for other states.

20. The method of claim 10 wherein the information for two groups of states occupies a same memory location, the stack functioning to distinguish the next state for each group.

21. The method of claim 10 wherein information relating to a state comprises $2^N$ operations wherein N is a number of bits used by the processor to determine an offset from an address of the state.

22. The method of claim 21 wherein the step of retrieving information comprises retrieving an operation stored at an address determined from bits within the data stream and a retrieved address of the next state.

23. The method of claim 22 wherein the determination of an offset is performed using only bitwise logical operations.

24. The method of claim 23 wherein the steps (c), (d) and (e) are performed iteratively and wherein the step of (e) switching the state machine into the next state comprises the step of providing the retrieved address of the next state as the address of the current state for a next iteration.

25. The method of claim 23 wherein when the operation is a stack push operation, a state address is pushed onto the stack and wherein the information also comprises a next state address.

26. A programmable hardware state machine comprising:
    a) a programmable memory for storing information relating to states within the state machine,
    b) a last in first out stack for storing data relating to a return state, the data for retrieval from the stack in a last in first out order; and,
    c) a processor for retrieving from the programmable memory an operation, the operations comprising a push operation including data relating to a next state address and a pop operation; for determining a next state based on one of information within the operation and data retrieved from the stack; and for switching the state machine into the next state,
    wherein information for two groups of states occupies a same memory location, the stack functioning to distinguish the next state for each group.

27. The state machine of claim 26 wherein the state machine is implemented in a single integrated circuit.

28. A packet classification state machine for classifying data from a data stream, the state machine comprising:
 a) a programmable memory for storing information relating to states within the state machine, the states including two groups of states; a first group of states each represented by a table of data including table elements addressable at an offset from the table address, the table elements indicative of a next state within the state machine, a plurality of bits in the data stream for determining the offset, a second group of states each represented by a table of data including a table element and occupying less memory than a table of data representing a state of the first group of states;
 b) a last in first out stack for storing data relating to a return state, the data for retrieval from the stack in a last in first out order; and,
 c) a processor for forming an address based on a current state address and a plurality of bits from the data stream; for retrieving from said formed address within the programmable memory an operation, the operations comprising a push operation including data relating to a next state address, a jump operation including data relating to a next state address, and a pop operation; for determining the next state based on one of information within the operation and data retrieved from the stack; and for switching the state machine into the next state, wherein one and only one operation retrieving information from the programmable memory is performed per state transition.

* * * * *